US007165170B2

(12) United States Patent
Rothman et al.

(10) Patent No.: US 7,165,170 B2
(45) Date of Patent: Jan. 16, 2007

(54) SYSTEM AND METHOD FOR FIRMWARE TO EXPORT PRE-BOOT DATA INTO THE OPERATING SYSTEM RUNTIME ENVIRONMENT

(75) Inventors: Michael A. Rothman, Olympia, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 387 days.

(21) Appl. No.: 10/662,110

(22) Filed: Sep. 12, 2003

(65) Prior Publication Data

US 2005/0060526 A1 Mar. 17, 2005

(51) Int. Cl.
G06F 9/00 (2006.01)
G06F 11/00 (2006.01)
(52) U.S. Cl. ............................. 713/1; 713/2; 714/45
(58) Field of Classification Search .................. 713/1, 713/2, 100; 719/318; 710/260; 714/45; 709/224
See application file for complete search history.

(56) References Cited

U.S. PATENT DOCUMENTS 5,245,615 A * 9/1993 Treu ............................ 714/45
6,463,531 B1 * 10/2002 Aguilar et al. ................ 713/2
6,738,832 B1 * 5/2004 Burr et al. ..................... 710/8
6,785,893 B1 * 8/2004 Morris et al. ............... 719/318
2002/0184366 A1 * 12/2002 Kimoto et al. .............. 709/224

OTHER PUBLICATIONS

Bert, boot log question, Dec. 2, 1999, microsoft.public.win98.gen_discussion, p. 2.*

* cited by examiner

Primary Examiner—Thomas Lee
Assistant Examiner—Suresh K Suryawanshi
(74) Attorney, Agent, or Firm—Joni D. Stutman-Horn (57) ABSTRACT

An embodiment of the present invention bridges event data from the pre-boot environment to the operating system runtime environment. Event logs are stored in a memory buffer during pre-boot. Prior to launching the operating system (OS), the event log is registered to a known memory location accessible to the OS. A preferred embodiment uses the extensible firmware interface (EFI) configuration table to store the event log. A globally unique identifier (GUID) may be used to identify the memory buffer location. Once accessible to the OS, the event data may be displayed using standard extensible Markup Language (XML) forms, or via any other desired method.

50 Claims, 6 Drawing Sheets

SYSTEM AND METHOD FOR FIRMWARE TO EXPORT PRE-BOOT DATA INTO THE OPERATING SYSTEM RUNTIME ENVIRONMENT

FIELD OF THE INVENTION

An embodiment of the present invention relates generally to computer systems and, more specifically, to bridging information from the pre-boot environment to the operating system run time environment.

BACKGROUND INFORMATION

Various events may take place during boot of a computer system. Often the user does not wish to view these events, especially if there are no failures. Sometimes, however, it would be desirable to view the boot log.

During boot, the system evolves from power on to discovery of memory, configuration and then launching of devices. The boot phase is complete once the "Boot Target," typically an operating system (OS) has launched. In state of the art systems, the OS has no visibility into the boot log. Thus, once the system boot is complete, the boot log is unavailable.

Many things can trigger an event to be logged during initialization. For instance, suppose during initialization of a hardware device, or something else related to the motherboard, an error occurs. An error event is logged. Also, a warning or a temperature setting can trigger an event to be logged. These events are logged in a pre-boot event log area.

Users may wish to view the log to determine if there are any problems with the system. There is no current standards-based mechanism to view this log information today. Today, if errors occur, an administrator must go into the pre-boot set up environment and view the log. In a more complex server environment, there might be a remote agent that parses through the error log while the system is in pre-boot.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to the export of pre-boot data to the runtime environment. In at least one embodiment, the pre-boot data is intended to be displayed using a standards-based browser. Enabling the export of pre-boot data to be accessible by a runtime system allows the pre-boot phase of a system to be more carefully monitored. The present system and method provides a standard mechanism to export all of the pre-boot environment data and make it available to the OS runtime environment. Effectively, the information is collected and instead of, or in addition to, storing it into some proprietary location in the firmware, embodiments of the present invention also create a memory buffer that is labeled as a runtime memory buffer so it is reserved by the firmware and not overwritten by the OS. This memory location may be described in a configuration table.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1A:
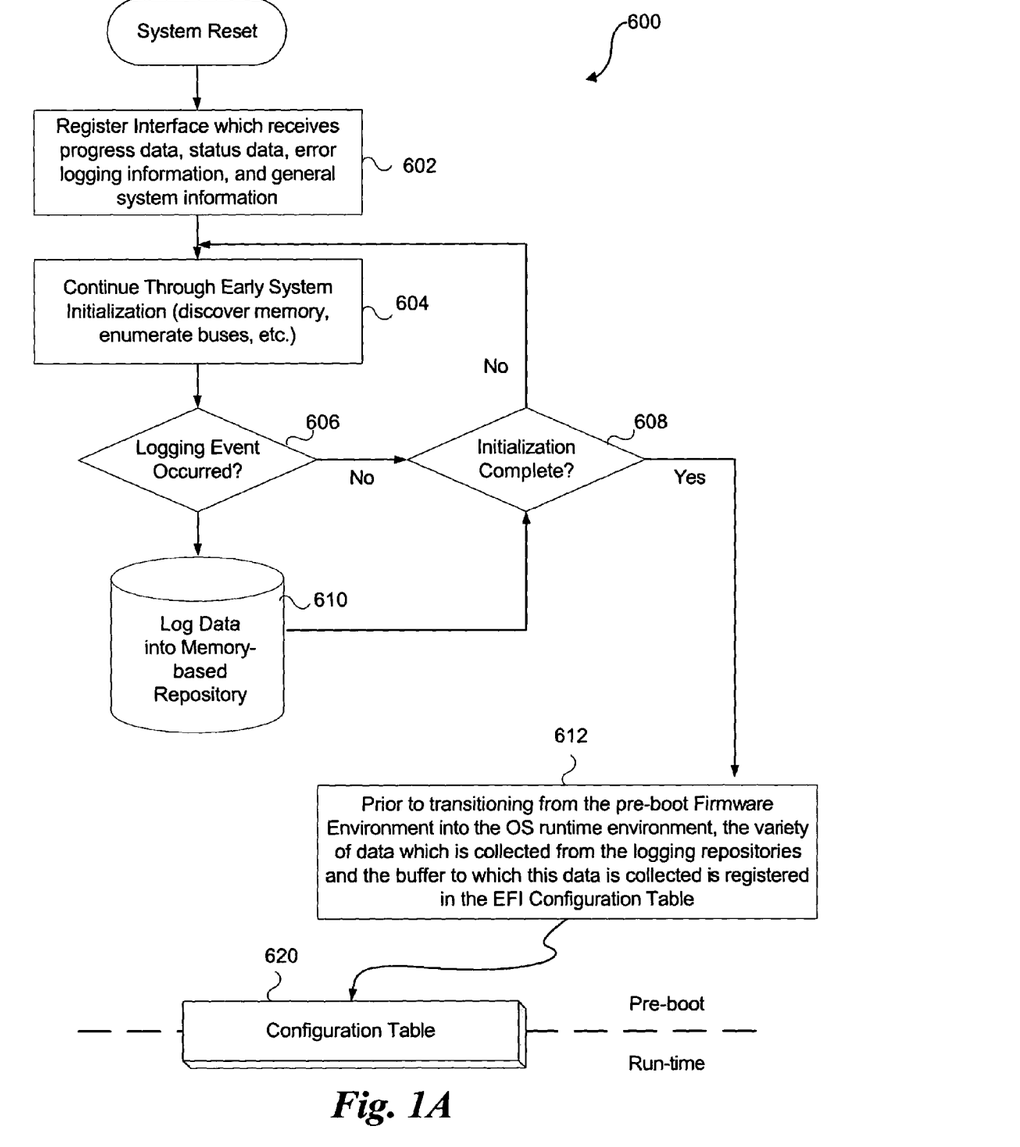
FIGS. 1A and 1B are flow diagrams of an exemplary method for exporting pre-boot data and displaying data in a standardized browser.
Figure 1B:
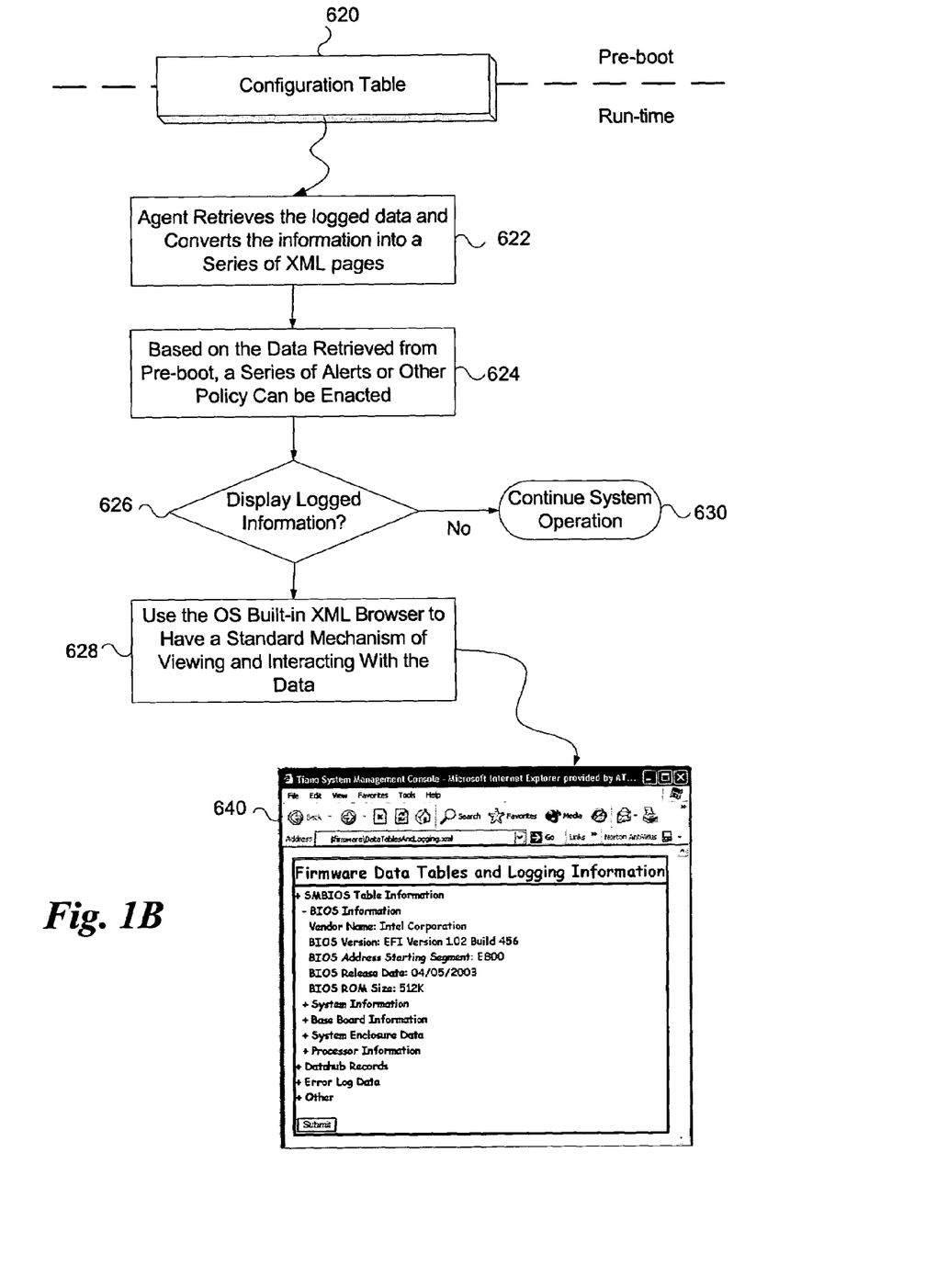

Referring to the drawings, and more particular to FIGS. 1A and 1B, there is shown a flow diagram of an exemplary method 600 for exporting pre-boot data and displaying data in a standardized browser. Specifically, FIG. 1A is directed toward the pre-boot phase and FIG. 1B is directed toward the runtime phase. When a system is reset, the interface which receives progress data, status data, error logging information, and general system information is registered with the error logging routine, in block 602. Early system initialization continues, i.e., memory discovery, bus enumeration, etc., in block 604.

When a logging event occurs, as determined by decision block 606, the event is logged into a memory-based repository, in block 610. It is determined whether initialization is complete, in decision block 608. If not, pre-boot continues at block 604. When initialization is complete, the variety of data collected during event logging is copied to a portion of memory accessible by the operating system (OS), in block 612. In one embodiment, the logging repository of data is registered with the EFI Configuration Table 620. The configuration table serves as a bucket of globally unique identifier (GUID)/pointer pairs, pointing to the data. A runtime buffer may be established to which the configuration table will have a pointer. The OS is then launched. The OS uses the pointers in the configuration table to retrieve the data.

Referring to FIG. 1B, the event data in the Configuration Table 620 is retrieved by an OS agent, in block 622. In one embodiment, the event data is converted into a series of XML pages. In some embodiments, a series of alerts or other actions can be performed, based on the data retrieved from the pre-boot event log, in block 624. For instance, if a temperature reading falls within a specific range, an alert may be sent to an administrator. This range might be outside of the failure range, so systems without the ability to export pre-boot events would boot successfully and no one would be aware that the system was in danger of overheating.

It is determined whether the event log is to be displayed in decision block 626. If not, system operation continues with runtime, as usual, in block 630. If so, then the event data is displayed in block 628, for perusal by the user. In one embodiment, the OS agent built a series of XML pages. In this embodiment, the XML pages are loaded and displayed 640 with a browser. XML pages have an advantage that most computing systems today have built-in browsers capable of viewing XML. It will be apparent to one skilled in the art that Hypertext Markup Language (HTML), Standard Generalized Markup Language (SGML), or similar formatting languages could be used to format the display. Further, for systems without a built-in browser, a simple textual or ASCII display could be used.

Figure 2:
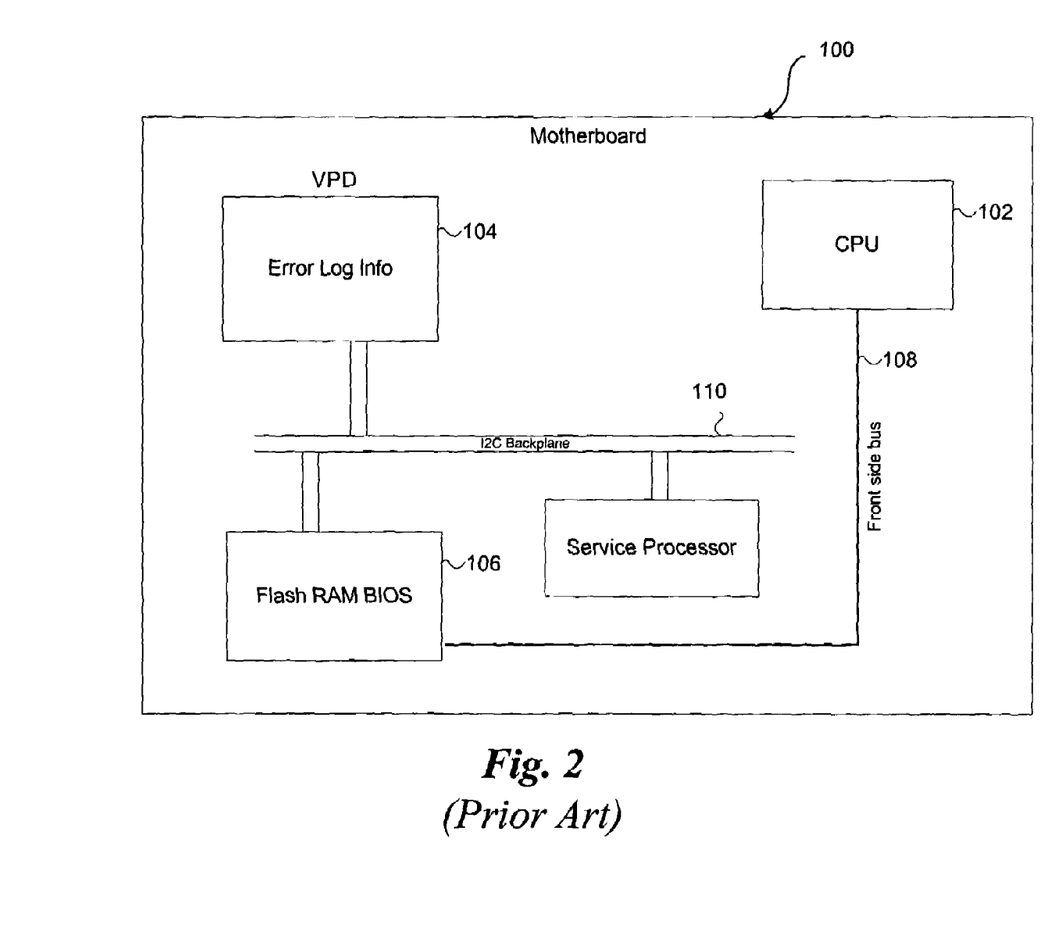
FIG. 2 is a block diagram of an exemplary motherboard having a processor requiring boot up, according to prior art.

Referring now to FIG. 2, there is shown a block diagram of an exemplary motherboard of the prior art, having a processor requiring boot up. A motherboard 100 has at least one processor 102 connected to a non-volatile memory for storing a boot sequence 106, via a front side bus 108. The boot sequence is frequently stored in flash random access memory (RAM) and in PC architecture is called the basic input/output system (BIOS). The BIOS is connected to a vital product data (VPD) storage location 104 via an I2C backplane 110. Access to the VPD is often limited by its proprietary nature. Event logging during pre-boot stores event data into the VPD. The VPD is not accessible by the operating system. Utilities that run during pre-boot are required to access and view the pre-boot event data.

The BIOS saves the error log into an area of the motherboard called the VPD. The event logger stores specific configuration information or error logging information. The VPD is typically constructed of proprietary static RAM (SRAM) that would be used by the motherboard and its associated firmware. The VPD is not an OS discoverable resource. It is typically accessed via GPIO (general protection IO) operations, which are proprietary. Some implementations have alternate storage locations where the information is stored on the flash itself.

Figure 3:
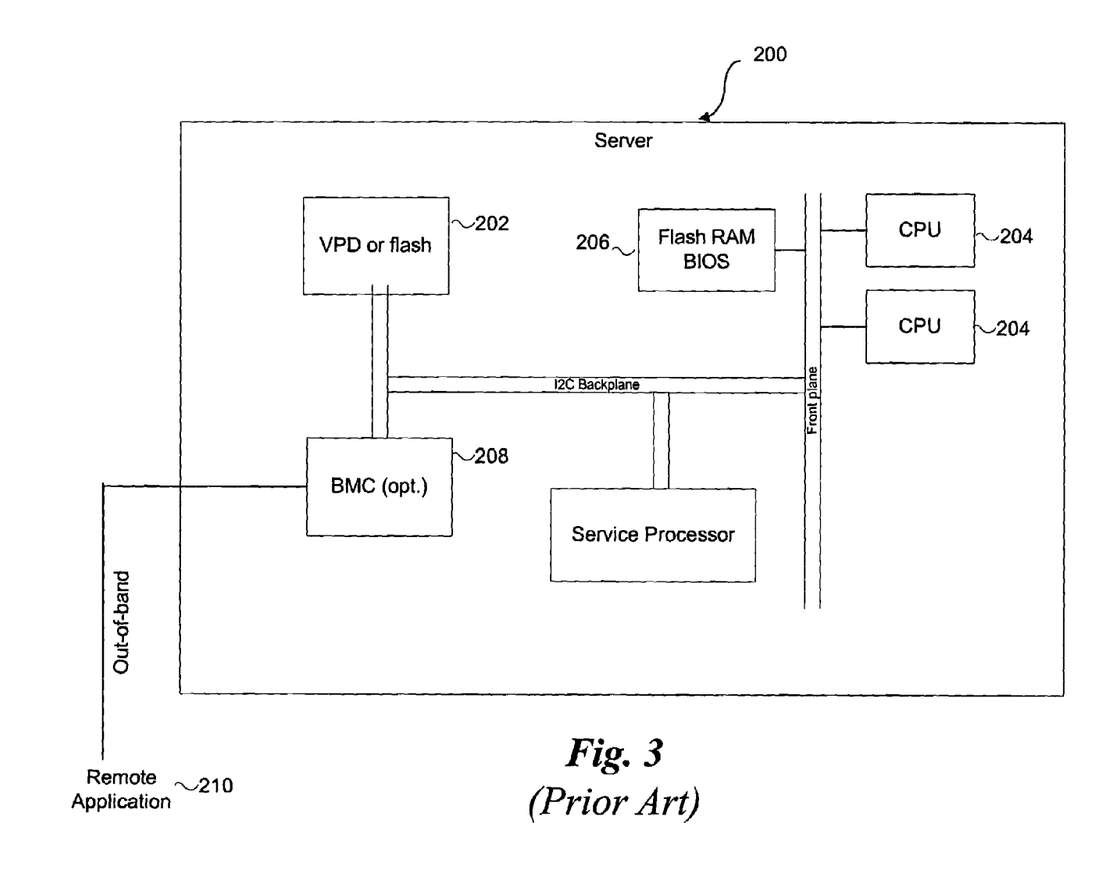
FIG. 3 is a block diagram of an exemplary server having an out-of-band monitor, according to the prior art.

Referring now to FIG. 3, there is shown a block diagram of an exemplary server 200 having an out-of-band monitor. Some servers are monitored via an out-of-band connection by a remote application 210. In this example, a server has at least one processor 204 connected to flash RAM 206, a baseboard management controller (BMC) 208 and a VPD or other flash memory 202. The BMC communicates with the remote application 210 via an out-of-band connection, and has access to the event log stored in the VPD/flash 202 via the BMC. In order for the remote application to retrieve the event log, it must be programmed to access the proprietary data store 202. Further, the access occurs during pre-boot. There is no standard method for retrieving this information by the server's OS during runtime.

Two classes of firmware are prevalent today: legacy firmware and IPF (Itanium Family of Processors) firmware running the extensible firmware interface (EFI) firmware interface. The present system and method establishes a standard mechanism of communication between pre-boot and the operating system for event data. A standard set of application programming interfaces (API's) including standard handshake and handoff processes between pre-boot and OS runtime are used. Certain constructs are established, so there are means to extend the firmware functionality in order to take advantage of other properties of the firmware.

Figure 4:
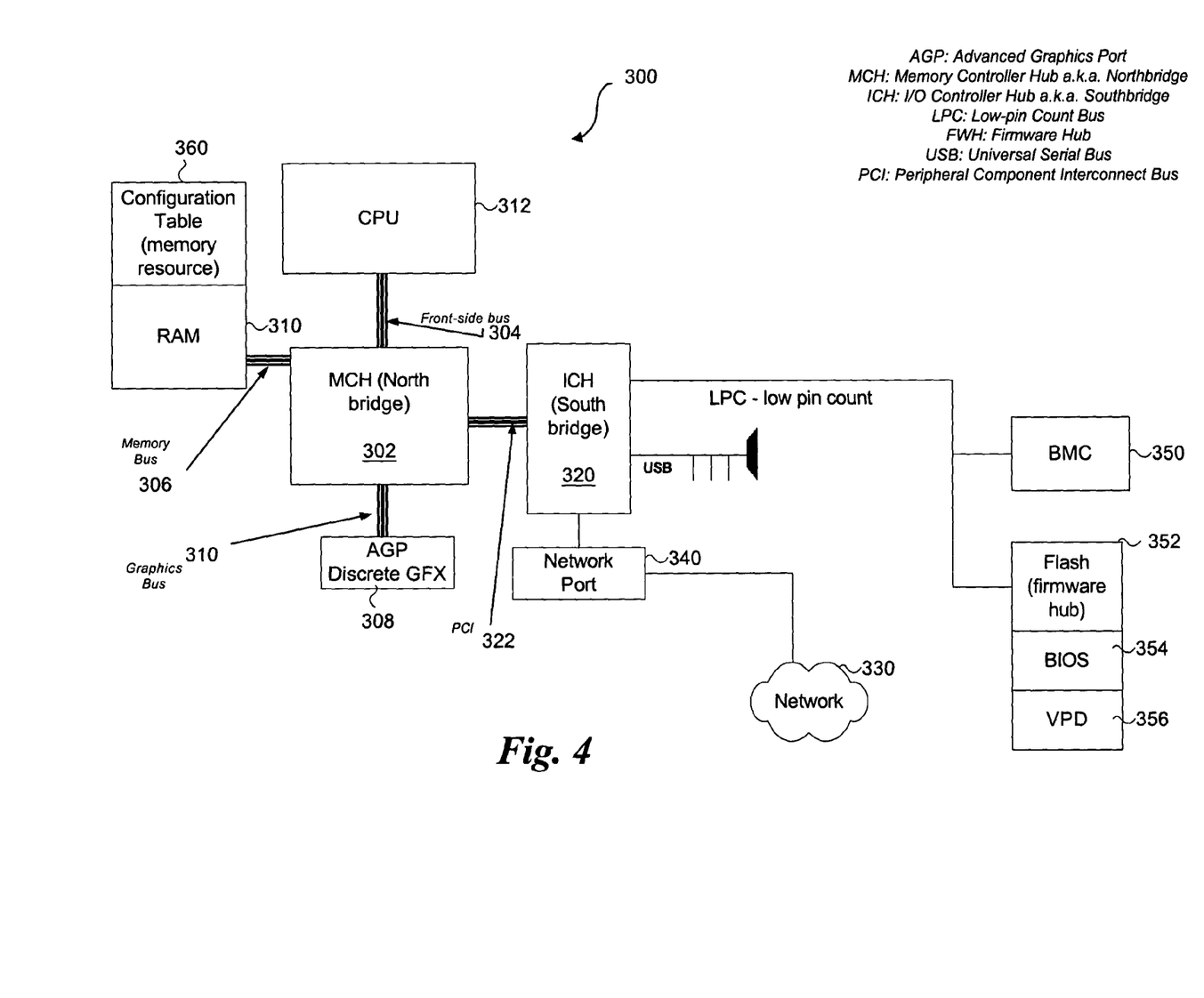
FIG. 4 is a block diagram of an exemplary computing system allowing export of pre-boot data.

Referring now to FIG. 4, there is shown a block diagram of an exemplary computing system allowing export of pre-boot data. Processor 312 communicates with a memory controller hub (MCH) 302, also known as Northbridge, via the front side bus 304. The MCH 302 communicates with system memory 310 via a memory bus 306. The system memory has a reserved location for a configuration table 360, typically for an EFI Configuration Table. It will be apparent to one skilled in the art that storage in available memory within an ACPI (Advanced Configuration Power Interface) table may be used as well. The MCH 302 may also communicate with an advanced graphics port (AGP) 308 via a graphics bus 310. The MCH 302 communicates with an I/O controller hub (ICH) 320, also known as Southbridge, via a peripheral component interconnect (PCI) bus 322. A baseboard management controller 350 may be connected to the processor via a low pin count (LPC) bus. The firmware hub 352 having both BIOS 354 and VPD 356 is typically connected to the processor via the LPC, as well. The processor may be operatively connected to a network 330 via a network port 340 through the ICH 320.

Figure 5:
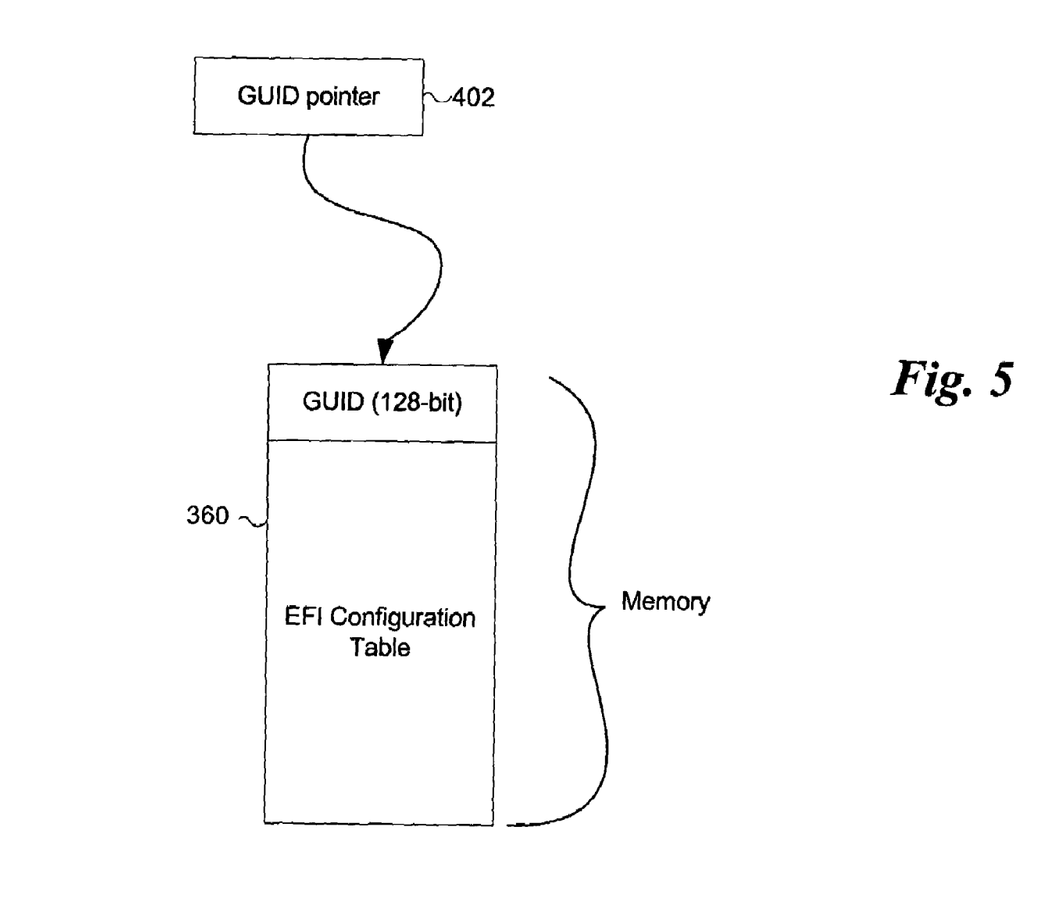
FIG. 5 is a block diagram showing an exemplary extensible firmware interface (EFI) configuration table in memory.

Referring now to FIG. 5, there is shown a block diagram illustrating an exemplary extensible firmware interface (EFI) table in memory. In one embodiment, a globally unique identifier (GUID) pointer 402 points to a location in memory 310 which holds the EFI configuration table 360. The GUID may be a 128-bit unique identifier. Both the pre-boot environment and the OS can access the table identified by the GUID. During pre-boot, events are logged into the proprietary VPD, or other non-volatile memory.

Firmware allocates some memory resource to be reserved for the event log. As the events occur, they are stored in the VPD and shadowed in a memory buffer. At some point in time prior to launching the OS, the BIOS determines that it has completed logging information. The BIOS then registers the buffer. Events may occur right up until booting the operating system.

An event logging handler is registered by the BIOS. This registration allows a protocol, or means by which event handlers or other processes in the system can call a common procedure for a common purpose. The registered handler is to be called by other processes, modules or drivers. The event logging handler is registered with the firmware that notifies all other event handlers to call this registered handler when they exhibit events. Registering an event handler installs it as a common catch-all for events that might occur. If a logging event occurs, then the event handler catches the event and logs data into the memory-based repository, or buffer, via the instructions in the event logging handler. Logging continues until pre-boot is complete.

The event data is then registered into the EFI configuration table. This table is similar to the ACPI table export. Until initialization is complete, the size required for this memory buffer is unknown. In one embodiment, the buffer is registered when it is full, and no more events are to be logged in it, just prior to launching the OS. Prior to launching the OS, the events are copied to a registered location in the EFI configuration table 360. When the OS boots, it uses the GUID pointer 402 to locate the event log in RAM. Once the events are available to the OS, they can be displayed, reported, saved, or transmitted, as desired by the user.

The eXtensible Markup Language (XML) can be used to map private firmware metadata for OS usage. The OS, in turn, can use a sophisticated presentation management engine, such as the Internet Explorer web browser, to view the data. This allows for simple, concise firmware encoding of binary data to be ballooned into verbose, ASCII XML for the OS, on the fly. The system and method described herein saves flash space in pre-boot, but allows for interoperability with future standards.

The techniques described herein are not limited to any particular hardware or software configuration; they may find applicability in any computing, consumer electronics, or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for bridging information from a pre-boot environment to a runtime environment comprising:
   registering an event logging handler with a plurality of event handlers in a pre-boot environment;
   storing a plurality of event data in a memory-based buffer, by the event logging handler, as events occur;
   retrieving the plurality of event data from the memory-based buffer; and
   storing the retrieved plurality of event data in a memory location accessible by an operating system, the storing being performed prior to launching of the operating system.

2. The method as recited in claim 1, wherein the event data stored in the memory-based buffer shadows event data stored in a proprietary memory, wherein the proprietary memory is accessible at pre-boot, but not by the operating system.

3. The method as recited in claim 1, wherein the proprietary memory is a non-volatile memory.

4. The method as recited in claim 1, wherein the memory location accessible by the operating system is identified by a globally unique identifier (GUID) pointer.

5. The method as recited in claim 4, wherein the GUID pointer points to a memory location reserved for an extensible firmware interface (EFI) configuration table.

6. The method as recited in claim 5, wherein buffer space in the EFI configuration table is made available for storing the memory-based buffer after all pre-boot events have been logged.

7. The method as recited in claim 4, wherein the GUID pointer points to a memory location reserved for an advanced configuration power interface (ACPI) configuration table.

8. The method as recited in claim 7, wherein buffer space in the ACPI configuration table is made available for storing the memory-based buffer after all pre-boot events have been logged.

9. The method as recited in claim 1, wherein event data comprises: progress data, status data, error logging information, and general system information.

10. The method as recited in claim 1, further comprising accessing the memory-based buffer by an operating system agent.

11. The method as recited in claim 10, further comprising performing an action, by the operating system agent in response to data accessed from the memory-based buffer.

12. The method as recited in claim 11, wherein the action performed is selected from the group of actions consisting of generating an alert, displaying event data, reporting event data, saving event data, transmitting event data, and transmitting a notification to a user.

13. The method as recited in claim 12, wherein displaying event data comprises:
   generating one or more eXtensible Markup Language (XML) pages having event data in a standardized format; and
   displaying the one or more XML pages using a standards based browser.

14. The method as recited in claim 13, wherein the displaying occurs during runtime.

15. A method for displaying pre-boot event data in a runtime environment, comprising:
   retrieving event data from a memory-based buffer, by an operating system agent during runtime, the memory-based buffer being generated in a pre-boot environment by an event logging handler, wherein the memory-based buffer resides in a reserved portion of system memory known to both the pre-boot environment and the runtime environment, and wherein the event logging handler is to be registered with a plurality of event handlers in the pre-boot environment; and
   displaying the event data during runtime, by the operating system agent.

16. The method as recited by claim 15, wherein the memory-based buffer is identified by a globally unique identifier (GUID) pointer.

17. The method as recited by claim 16, wherein the GUID pointer points to a location in memory corresponding to an extensible firmware interface (EFI) configuration table.

18. The method as recited by claim 16, wherein the GUID pointer points to a location in memory corresponding to an advanced configuration power interface (ACPI) configuration table.

19. The method as recited by claim 15, wherein displaying comprises:
retrieving event data from the memory-based buffer;
generating at least one page for display, based upon the retrieved event data; and
displaying the at least one generated page on a display device.

20. The method as recited by claim 19, wherein the generated pages are in extensible markup language (XML) format.

21. The method as recited by claim 19, wherein the at least one generated page are displayed using a standards-based browser.

22. An article of manufacture comprising a machine-accessible medium having instructions that, when executed, cause the machine to:
register an event logging handler with a plurality of event handlers in a pre-boot environment;
store a plurality of event data in a memory-based buffer, byte event logging handler, as events occur;
retrieve the plurality of event data from the memory-based buffer; and
store the retrieved plurality of event data in a memory location accessible by an operating system, the storing being performed prior to launching of the operating system.

23. The article as recited in claim 22, wherein the event data stored in the memory-based buffer shadows event data stored in a proprietary non-volatile memory, wherein the non-volatile memory is accessible at pre-boot, but not by the operating system.

24. The article as recited in claim 22, wherein the memory location accessible by the operating system is identified by a globally unique identifier (GUID) pointer.

25. The article as recited in claim 24, wherein the GUID pointer points to a memory location reserved for an extensible firmware interface (EFI) configuration table.

26. The article as recited in claim 25, wherein buffer space in the EFI configuration table is made available for storing the memory-based buffer after all pre-boot events have been logged.

27. The article as recited in claim 24, wherein the GUID pointer points to a memory location reserved for an advanced configuration power interface (ACPI) configuration table.

28. The article as recited in claim 27, wherein buffer space in the ACPI configuration table is made available for storing the memory-based buffer after all pre-boot events have been logged.

29. The article as recited in claim 22, wherein event data comprises: progress data, status data, error logging information, and general system information.

30. The article as recited in claim 22, further comprising instructions that cause the machine to access the memory-based buffer by an operating system agent.

31. The article as recited in claim 30, further comprising instructions that cause the machine to perform an action, by operating system agent, in response to data accessed from the memory-based buffer.

32. The article as recited in claim 31, wherein the action performed is selected from the group of actions consisting of generating an alert, displaying event data, reporting event data, saving event data, transmitting event data, and transmitting a notification to a user.

33. The article as recited in claim 32, wherein displaying event data comprises:
generating one or more eXtensible Markup Language (XML) pages having event data in a standardized format; and
displaying the one or more XML pages using a standards based browser.

34. The article as recited in claim 33, wherein the displaying occurs during runtime.

35. An article of manufacture comprising a machine-accessible medium, having instructions that, when executed, cause the machine to:
retrieve event data from a memory-based buffer, by an operating system agent during runtime, the memory-based buffer being generated in a pre-boot environment by an event logging handler, wherein the memory-based buffer resides in a reserved portion of system memory known to both the pre-boot environment and the runtime environment; and wherein the event logging handler is to be registered with a plurality of event handlers in the pre-boot environment;and
display the event data during runtime, by the operating system agent.

36. The article as recited by claim 35, wherein the memory-based buffer is identified by a globally unique identifier (GUID) pointer.

37. The article as recited by claim 36, wherein the GUID pointer points to a location in memory corresponding to an extensible firmware interface (EFI) configuration table.

38. The article as recited by claim 36, wherein the GUID pointer points to a location in memory corresponding to an advanced configuration power interface (ACPI) configuration table.

39. The article as recited by claim 35, wherein displaying comprises:
retrieving event data from the memory-based buffer;
generating at least one page for display, based upon the retrieved event data; and
displaying the at least one generated page on a display device.

40. The article as recited by claim 39, wherein the generated pages are in extensible markup language (XML) format.

41. The article as recited by claim 39, wherein the at least one generated page is displayed using a standards based browser.

42. A system for bridging information from a pre-boot environment to a runtime environment, comprising:
a processor, wherein the processor is operatively coupled with a non-volatile pre-boot memory store and a random access memory (RAM);
a memory for storing event data in a pre-boot environment operatively coupled with the processor, a memory-based buffer for shadowing pre-boot environment event data, the memory-based buffer being accessible by an operating system agent, and operatively coupled to the processor; and
an event logging handler running on the processor during pre-boot, the event logging handler for registering the pre-boot event data to the memory-based buffer, wherein the event logging handler is to be registered with a plurality of event handlers in the pre-boot environment.

43. The system as recited in claim 42, wherein the pre-boot memory store is flash RAM storing a basic input/output system (BIOS).

44. The system as recited in claim 42, wherein the memory-based buffer is stored in an extensible firmware interface (EFI) configuration table, and is accessible using a globally unique identifier (GUID) pointer.

45. The system as recited in claim 42, wherein the memory-based buffer is stored in an advanced configuration power interface (ACPI) configuration table, and is accessible using a globally unique identifier (GUID) pointer.

46. The system as recited in claim 42, further comprising:
a display device operatively coupled to the processor and in communication with the operating system agent; and
a user interface, the user interface retrieving the pre-boot environment event data from the memory-based store and formatting the pre-boot environment event data for displaying on the display device.

47. The system as recited in claim 46, wherein the pre-boot environment event data is formatted into a series of extensible markup language (XML) pages by the user interface.

48. The system as recited in claim 42, wherein the memory for storing event data in a pre-boot environment is flash RAM.

49. The system as recited in claim 48, wherein the memory for storing event data resides on the flash RAM comprising the non-volatile pre-boot memory store.

50. The system as recited in claim 48, wherein the memory for storing event data is a firmware hub comprising a BIOS and vital product data (VPD).

* * * * *